(12) United States Patent
Muller et al.

(10) Patent No.: US 7,557,156 B2
(45) Date of Patent: Jul. 7, 2009

(54) AQUEOUS HYDROXY-FUNCTIONAL POLYESTER DISPERSIONS CONTAINING URETHANE GROUPS

(75) Inventors: Heino Muller, Leverkusen (DE); Harald Blum, Leverkusen (DE); Ulrich Freudenberg, Pulheim (DE)

(73) Assignee: Bayer MaterialScience AG (DE)

( * ) Notice: Subject to any disclaimer, the term of this patent is extended or adjusted under 35 U.S.C. 154(b) by 0 days.

(21) Appl. No.: 11/602,002

(22) Filed: Nov. 20, 2006

(65) Prior Publication Data
US 2007/0123643 A1   May 31, 2007

(30) Foreign Application Priority Data
Nov. 26, 2005   (DE) .................. 10 2005 056 434

(51) Int. Cl.
*C08G 18/08* (2006.01)
(52) U.S. Cl. .................. 524/589; 524/591; 524/839; 524/840
(58) Field of Classification Search .................. 524/589
See application file for complete search history.

(56) References Cited

U.S. PATENT DOCUMENTS

| 4,108,814 | A |   | 8/1978 | Reiff et al. .................. 260/29.2 |
| 4,608,413 | A |   | 8/1986 | Nachtkamp et al. .......... 524/591 |
| 5,004,779 | A |   | 4/1991 | Blum et al. .................. 524/591 |
| 5,126,393 | A |   | 6/1992 | Blum et al. .................. 524/538 |
| 5,194,487 | A |   | 3/1993 | Jacobs ........................ 524/591 |
| 5,280,062 | A |   | 1/1994 | Blum et al. .................. 524/591 |
| 5,387,642 | A |   | 2/1995 | Blum et al. .................. 524/591 |
| 5,389,718 | A |   | 2/1995 | Potter et al. .................. 524/591 |
| 5,569,707 | A |   | 10/1996 | Blum et al. .................. 524/591 |
| 5,608,000 | A |   | 3/1997 | Duan et al. .................. 524/591 |
| 6,583,215 | B2 | * | 6/2003 | Probst et al. .................. 524/589 |
| 2005/0027092 | A1 | * | 2/2005 | Steidl et al. .................... 528/44 |
| 2005/0209399 | A1 |   | 9/2005 | Munzmay et al. ........... 524/589 |

FOREIGN PATENT DOCUMENTS

CA           2059420           7/1992

* cited by examiner

*Primary Examiner*—Mark Eashoo
*Assistant Examiner*—Noah Frank
(74) *Attorney, Agent, or Firm*—Connolly Bove Lodge & Hutz LLP

(57) ABSTRACT

The invention relates to new, aqueous, hydroxy-functional polyester dispersions containing urethane groups, to a process for preparing them, and to their use in combination with crosslinker resins for preparing paints, coatings and adhesives.

14 Claims, No Drawings

AQUEOUS HYDROXY-FUNCTIONAL POLYESTER DISPERSIONS CONTAINING URETHANE GROUPS

CROSS-REFERENCE TO RELATED APPLICATIONS

The present application claims the right of priority under 35 U.S.C. §119 (a)-(d) of German Patent Application Number 10 2005 056 434.8, filed Nov. 25, 2005.

BACKGROUND OF THE INVENTION

The invention relates to new, aqueous, hydroxy-functional polyester dispersions containing urethane groups, to a process for preparing them, and to their use in combination with crosslinker resins for preparing paints, coatings and adhesives.

Aqueous polyester dispersions for high-solids baking varnishes are known, as disclosed for example in EP-A 498 156, which, as an essential constituent, include polyester resins containing urethane, carboxyl and hydroxyl groups. The polyester resins are reaction products of 77% to 89% by weight of a branched polyester polyol, 2.5% to 4.5% by weight of a bis(hydroxymethyl)alkanecarboxylic acid and 9% to 19% by weight of a diisocyanate component of which at least 50% is composed of hexamethylene diisocyanate. These products are suitable for preparing high-solids paints, but in certain applications no longer satisfy the requirements in terms of application reliability and of the resulting coating properties, particularly in terms of the paint flow and the appearance of surface defects. In order to bring the application reliability more into line with practical requirements, it is frequently necessary with these systems to use relatively large amounts of volatile organic solvents, which is undesirable on economic and environmental grounds, and does not always lead to satisfactory results.

Aqueous binder combinations comprising a polyester dispersion containing urethane, hydroxyl and carboxylate groups and a polyisocyanate component dispersed in the dispersion and containing free isocyanate groups are described, for example, in EP-A 496 205. The polyester dispersions of EP-A 496 205 contain, relatively high fractions of carboxyl and/or carboxylate groups (acid number 10 to 45 mg KOH/g substance), to allow the polyisocyanate component to be stably dispersed and to allow homogeneous, clear coatings. The application reliability and the film optical properties of the binder combinations of EP-A 496 205, however, frequently no longer satisfy the exacting present-day requirements in terms of flow, achievable coat thickness, and the resistance properties of the coating with respect to exposure to water or solvent.

EP-A 469 389 discloses aqueous 2-component polyurethane coating compositions based on aqueous polyurethane dispersions having a urethane and/or urea group content (—NH—COO—) of 9% to 20% and on water-dispersible polyisocyanate crosslinkers containing hydrophilic anionic and ethylene oxide groups. These products contain relatively large amounts of organic solvents and are suitable for preparing reactive 2-component coatings which can be cured at room temperature and have a narrowly restricted pot life, but not for storage-stable baking varnishes which can be processed as one-component systems. Owing to the high fractions of hydrophilic groups, the resistance properties and also the film optical properties are not always in accordance with the requirements.

DE-A 3 345 448 describes aqueous polyurethane baking varnishes comprising polyurethane prepolymers containing carboxylate groups and blocked isocyanate groups, and also polyhydroxy compounds which contain carboxylate groups and are based on polyether- and/or polyester-urethane prepolymers. These products contain relatively large amounts of organic solvents and are notable in particular for their ready pigmentability. In respect of application reliability, the flow of the coatings, and the achievable defect-free coat thickness, however, there exists need for improvement. In this system the polyethers used in addition may have an adverse impact on the weathering properties of the coatings. Likewise, as a result of the presence of carboxylate groups in both components of the baking varnishes, the hydrophilicity of the coatings is increased.

DE-A 3 936 288 describes water-dispersible binder combinations for baking surfaces, which comprise urethane-modified polyester resins containing carboxylate groups, among others. The resins have acid number of 15 to 36 mg KOH/g substance and are reaction products of 72% to 80% by weight of polyester polyol, 4% to 7% by weight of 2,2-bis(hydroxymethyl)alkanecarboxylic acid and 15% to 25% by weight of a diisocyanate component. The products contain relatively large amounts of organic solvents, and the corresponding coatings do not always satisfy the requirements in respect of application reliability and resistance properties.

EP-A 669 352 discloses aqueous dispersions of polyester-polyurethanes suitable for use in highly elastic paints, coatings and sealants, especially in soft-feel coating materials. The polyester-polyurethanes are substantially reaction products of linear polyester polyols and other linear polyols, such as polycarbonate diols or polyether diols, for example, hydroxy- and/or aminocarboxylic acids, if appropriate, low molecular weight compounds containing hydroxyl groups or amino groups, optionally hydrophilic alcohols containing ethylene oxide units, and a polyisocyanate component. The products are less suitable for paints and coatings, such as baking surfaces or one-coat topcoats, for example, owing to their high elasticity, the pronounced soft-feel effect and the low functionality (substantially difunctional). The products described in EP-A 669 352 are employed essentially in aqueous three-component paints composed of hydroxy-functional dispersion, non-functional dispersion and crosslinker. In terms of preparation and application, this system is much too complicated for numerous fields of application. Consequently there continues to be a need for cost-effective alternatives which are easily preparable, and which ought to exhibit improved application properties.

DE-A 3 901 190 describes a process for preparing aqueous, oxidatively drying alkyd resins (which, in other words, are crosslinkable by reaction with atmospheric oxygen), which contain 70% to 88% by weight of an alkyl resin, 4% to 7% by weight of 2,2-bis(hydroxymethyl)alkanecarboxylic acid and 10% to 23% by weight of a diisocyanate component and additionally contain organic solvents. These products are unsuitable for preparing binder combinations having the properties described above, as they exhibit very severe yellowing when cured at elevated temperatures, owing to the high fractions of unsaturated fatty acids.

Although the prior art covers a variety of polyester-polyurethane dispersions, there continues to be a need for improved, hydroxy-functional, polyester dispersions containing urethane groups. These dispersions ought to be easily preparable on the basis of inexpensive raw materials, in other words using minimal amounts of—generally expensive—hydrophilicizing agents and isocyanate components. Moreover, in their aqueous supply form, they ought to contain little organic solvent, ought to be stable for a relatively long time, in other words, not exhibit any disproportionately large hydrolytic degradation on storage, and in combination with a very wide variety of crosslinker resins ought to produce storage-stable paint formulations. These paint formulations ought to ensure high application reliability, particularly with respect to flow and susceptibility to cratering. Furthermore, they ought to exhibit coat thicknesses which can be achieved without defect, ought not to have any pronounced soft-feel character, and overall, after curing, ought to exhibit a balanced level of properties in respect of hardness/elasticity, adhesion, solvent resistance and film optical properties.

Surprisingly it has been found that special hydroxy-functional polyester dispersions containing urethane groups meet the requirements set out above and in combination with crosslinker resins, such as melamine resins and/or polyisocyanates, for example, can be cured to paints and coatings having the requisite level of properties. A particularly surprising feature is that even with the extremely low levels of hydrophilic groups for this class of raw material, it is possible to obtain extremely stable and relatively fine-particled dispersions. In spite of the use of large amounts of highly branched and hence highly functionalized polyesters, it is possible, with a reaction regime in accordance with the invention, to prepare stable dispersions, which meet the requirements described, in an inexpensive way.

SUMMARY OF THE INVENTION

The invention provides hydroxy-functional polyester dispersions containing urethane groups and comprising the following synthesis components:
a) 87.0% to 95% by weight of at least one hydroxy-functional polyester having an average functionality>2,
b) 1% to 2.4% by weight of at least one di- and/or tri- and/or mono-hydroxycarboxylic acid and/or hydroxysulphonic acid and/or aminosulphonic acid and/or aminocarboxylic acid,
c) 4% to 10.6% by weight of one or more at least difunctional polyisocyanate component and
d) 0 to 3% by weight of other components, the percentages a) to d) adding up to 100%, and at least 50% of the acid groups incorporated via component b) are in the form of salt groups.

The percentages for a), b), c) and d) are based always on 100%.

The invention further provides for hydroxy-functional polyester dispersions containing urethane groups as described above, characterized in that the polyesters of component a) are reaction products of
a1) 30% to 77% by weight of one or more at least difunctional carboxylic acids and/or anhydrides thereof,
a2) 20% to 50% by weight of at least one diol,
a3) 3% to 30% by weight of at least one alcohol having more than 2 hydroxyl groups,
a4) 0 to 20% by weight of other hydroxy- and/or carboxy-functional components and/or caprolactone.

The invention also provides a method of preparing the hydroxy-functional polyester dispersions containing urethane groups described above, comprising reacting components a) to d) at a temperature of 40 to 140° C. and in the presence of 5% to 50% by weight of organic solvents and non-NCO-reactive neutralizing agents until the NCO value has reached 0%.

The invention further provides a method of preparing the hydroxy-functional polyester dispersions containing urethane groups described above, comprising i) preparing an NCO-functional intermediate by reacting components b), c) and d) with an amount of component a) such as to result in an NCO:OH(NH) ratio of greater than 1.4:1, at 40 to 140° C. in the presence of 5% to 50% by weight of organic solvents and non-NCO-reactive neutralizing agents, and
ii) adding the remainder of component a) to the NCO-functional intermediate and, optionally, further solvents and/or neutralizing agents until the NCO content has reached 0%.

DETAILED DESCRIPTION OF THE PREFERRED EMBODIMENTS

Other than in the operating examples, or where otherwise indicated, all numbers or expressions referring to quantities of ingredients, reaction conditions, etc. used in the specification and claims are to be understood as modified in all instances by the term "about."

Unless otherwise indicated, all references to molecular weight in the specification and claims are to be understood as references to weight average molecular weight.

The polyester dispersions of the invention preferably contain 88.5% to 93% by weight of component a), 1.5% to 2.2% by weight of component b), 5.0% to 9.3% by weight of component c) and 0 to 1% of other components d).

The polyester dispersions of the invention more preferably contain 89.2% to 93% by weight of component a), 1.5% to 2.2% by weight of component b), and 5.0% to 8.6% by weight of component c).

The acid numbers of the hydroxy-functional polyester dispersions containing urethane groups of the invention, incorporated via component b), are 5.0 to 14.5 mg KOH/g substance, preferably 5.0 to 9.9 mg KOH/g and very preferably 6.0 to 8.9 mg KOH/g substance. These low acid numbers have a surprisingly beneficial effect on the film optical properties of corresponding coatings, such as flow, cratering susceptibility and achievable coat thickness, for example. Surprisingly, even with such low acid numbers, it is possible to obtain stable, high-value dispersions without the need to use external emulsifiers, stabilizers or surface-active substances.

In preferred dispersions of the invention at least 75%, more preferably at least 95% of the acid groups incorporated via component b) are in the form of salt groups. The acid groups incorporated via component b) are preferably in the form of carboxylate groups.

The urethane group content of the polyester dispersions of the invention (determined according to the fraction of the structural formula —NH—CO—O— as a proportion of the overall structure of the 100% polymer on which the polyester dispersions of the invention are based) is in the range from 3.0% by weight to 6.4% by weight, preferably from 4.0% by weight to 6.2% by weight.

Surprisingly, in spite of this low urethane group content, stable and high-value dispersions are obtained which exhibit the requisite level of properties.

The weight average molecular weights $M_w$ of the dispersions of the invention, which can be determined, for example, by gel permeation chromatography using polystyrene as standard, are typically 8000 to 26,000 g/mol, preferably 10,000 to 18,000 g/mol. Such weight average molecular weights are substantially lower than for example, prior-art polyurethane dispersions.

Suitable polyesters a) can be prepared by methods known per se with elimination of water at temperatures from 100 to 260° C., optionally with the accompanying use of typical esterification catalysts, preferably in accordance with the principle of a melt condensation or azeotropic condensation. A preferred preparation method for the polyesters a) is a melt condensation under reduced pressure or using an inert gas.

The polyesters a) have an average functionality of >2.0, preferably of >2.5 and more preferably of >3.0.

The theoretical functionality of the polyesters a) is determined in accordance with the following formula:

*eq* OH-*eq* COOH/(mol COOH+mol OH)-*eq* COOH.

In this context it is also possible to use mixtures of different polyesters and mixtures of polyesters with different functionalities, the average functionalities even of the polyester mixtures being >2, preferably >2.5 and more preferably >3.0. The accompanying use of polyester with a functionality of =2 or less in these polyester mixtures is possible in minor amounts.

The polyesters a) have arithmetically determined theoretical molecular weights of 500 to 5,000g/mol, preferably of 750 to 4,000 g/mol, more preferably of 750 to 2,500 g/mol.

The theoretical molecular weight of the polyesters is determined in accordance with the following formula: mass of the batch [g]/(mol COOH+mol OH)-eq COOH.

Polyesters a) employed with preference are reaction products of
a1) 30% to 77% by weight of at least one at least difunctional carboxylic acid and/or anhydride thereof,
a2) 20% to 50% by weight of at least one diol,
a3) 3% to 30% by weight of at least one alcohol having more than 2 hydroxyl groups,
a4) 0 to 20% by weight of other hydroxy- and/or carboxyfunctional components and/or caprolactone.

Particularly preferred polyesters a) are reaction products of
a1) 40% to 68% by weight of at least one at least difunctional carboxylic acid and/or anhydride thereof,
a2) 25% to 50% by weight of at least one diol,
a3) 7% to 26% by weight of at least one alcohol having more than 2 hydroxyl groups,
a4) 0 to 5% by weight of other hydroxy- and/or carboxyfunctional components and/or caprolactone.

Suitable polyester raw materials a1) are, for example, phthalic anhydride, isophthalic acid, terephthalic acid, adipic acid, sebacic acid, suberic acid, succinic acid, maleic anhydride, fumaric acid, dimer fatty acids, tetrahydrophthalic anhydride, hexahydrophthalic anhydride, cyclohexane dicarboxylic acid and/or trimellitic anhydride and mixtures of these and/or other raw materials a1).

Preferred components a1) are adipic acid, phthalic anhydride, tetrahydrophthalic anhydride, isophthalic acid and glutaric acid.

With particular preference component a1) is a mixture of at least one aliphatic dicarboxylic acid of substantially linear construction and at least one at least difunctional carboxylic acid and/or anhydride thereof. Very particular preference is given to a mixture of phthalic anhydride and/or isophthalic acid with adipic acid and/or glutaric acid in a ratio of 0.8 to 3 parts of aromatic dicarboxylic acid and/or anhydride thereof relative to 1 part of aliphatic carboxylic acid.

Suitable polyester raw materials a2) are, for example, 1,2-ethylene glycol, diethylene glycol, triethylene glycol, tetraethylene glycol, 1,2-propylene glycol, dipropylene glycol, tripropylene glycol, 1,3-propanediol, 1,3-butanediol, 1,4-butanediol, 1,6-hexanediol, neopentyl glycol, 1,4-cyclohexanedimethanol, 1,4-butenediol, butenediol, butynediol, hydrogenated bisphenols, trimethylpentanediol, 1,8-octanediol and/or tricyclodecanedimethanol and mixtures of these and/or other raw materials a2).

Preferred components a2) are 1,4-butanediol, neopentyl glycol, 1,2-propylene glycol, ethylene glycol, diethylene glycol and 1,6-hexanediol. With particular preference a2) is a diol comprising at least 60% of neopentyl glycol.

Suitable polyester raw materials a3) are, for example, trimethylolpropane, ethoxylated trimethylolpropane, propoxylated trimethylolpropane, propoxylated glycerol, ethoxylated glycerol, glycerol, pentaerythritol, castor oil and/or mixtures of these and/or other raw materials a3).

Preferred components a3) are trimethylolpropane, glycerol, castor oil and pentaerythritol. With particular preference component a3) contains at least 20% by weight, based on the total amount of a3), of castor oil. Very particular preference is given to a mixture of trimethylolpropane or glycerol with castor oil in a ratio of 0.25 to 1.25 parts of castor oil relative to 1 part of trimethylolpropane or glycerol.

Suitable polyester raw materials a4) for optional use are, for example, $C_8$-$C_{22}$ fatty acids such as 2-ethylhexanoic acid, stearic acid, hydrogenated fatty acids, benzoic acid, monofunctional alcohols such as butyl glycol, butyl diglycol, cyclohexanol, other monofunctional alcohols such as polyethylene oxides, polypropylene oxides, polyethylene/polypropylene oxide copolymers and block copolymers, and/or else mixtures of the aforementioned and also, optionally, other components a4).

Preferred components a4) and monofunctional alcohols such as polyethylene oxides, polypropylene oxides, polyethylene/propylene oxide copolymers and block copolymers with particular preference components a4) are not used.

Component a) of the polyester dispersions of the invention is composed preferably of 60% to 100% by weight of at least one polyester and 40% to 0% by weight of other hydroxyfunctional components of the molecular weight range from 500 to 5,000 g/mol which may contain $C_2$ and/or $C_3$ and/or $C_4$ polyether and/or carbonate and/or polyether ester and/or addition-polymer and/or polyester structural units. The average functionality of such optionally employed mixtures is preferably >2.5, more preferably >3.0. The main polyester component present in such mixtures at 60 to 100% preferably has a functionality >3.

Especially preferred polyesters a) are reaction products of
a1) 40% to 68% by weight of a mixture of phthalic anhydride and/or isophthalic acid with adipic acid and/or glutaric acid in a ratio of 0.8 to 3 parts of aromatic dicarboxylic acid and/or anhydride thereof relative to 1 part of aliphatic carboxylic acid.
a2) 25% to 50% by weight of a diol composed to an extent of at least 60% of neopentyl glycol,
a3) 7% to 26% of alcohols having more than 2 hydroxyl groups, composed of a mixture of trimethylolpropane or glycerol with castor oil in a ratio of 0.25 to 1.25 parts of castor oil relative to 1 part of trimethylolpropane or glycerol, which have an arithmetically determinable molecular weight Mw of 750 to 2,500 g/mol and a functionality >3.

Component b) comprises at least one ionic or potentially ionic compound having at least one acid group and at least one group that is reactive towards isocyanate groups. Examples of suitable acid groups include carboxyl groups and sulphonic acid groups. Examples of suitable groups that are reactive towards isocyanate groups include hydroxyl groups and/or amino groups.

Suitable components b) are, for example, di- and/or tri- and/or monohydroxy-carboxylic acids and/or hydroxysulphonic acids and/or aminosulphonic acids and/or aminocarboxylic acids.

Component b) is preferably carboxylic acid containing at least one, preferably one or two hydroxyl and/or amino groups. Particular preference is given to using as component b) dimethylolpropionic acid, dimethylolbutyric acid and/or hydroxypivalic acid.

Likewise suitable acids are, for example, other 2,2-bis (hydroxymethyl)alkane-carboxylic acid, such as dimethylolacetic acid or 2,2-dimethylolpentanoic acid, dihydroxysuccinic acid, Michael adducts of acrylic acid with amines such as isophoronediamine or hexamethylenediamine, or mixtures of such acids and/or dimethylolpropionic acid and/or hydroxypivalic acid. Likewise possible is the use of sulphonic acid diols optionally containing ether groups, of the kind described in U.S. Pat. No. 4,108,814, or else of 2-aminoethylaminoethanesulphonic acid.

The free acid groups represent "potentially ionic" groups, whereas the salt-like groups obtained by neutralization with neutralizing agents, carboxylate and/or sulphonate groups, are "ionic" groups.

Suitable neutralizing agents, which may even be present during reaction of components a) to d), are, for example, triethylamine, N-methylmorpholine, dimethylisopropylamine, ethyl diisopropylamine, dimethylcyclohexylamine, potassium hydroxide and/or sodium hydroxide.

After complete reaction of components a) to d) it is also possible to add other neutralizing agents before, during or after the dispersing operation. Neutralizing agents suitable at this point, in addition to those identified above, are, for example, dimethylolamine, ammonia, morpholine, N-methyldiethanolamine, aminomethyl-propanol, triethanolamine, ethanolamine, diethanolamine and/or 2-amino-2-methyl-1-propanol and/or others. It is also possible to use mixtures or combinations of different neutralizing agents.

The amount of neutralizing agent added in total is such that the degree of neutralization, based on incorporated acid groups, is at least 50%, preferably at least 75% and more preferably at least 95%. With a degree of neutralization of above 100%, there is then free neutralizing amine present additionally, as well as 100% ionic salt groups. As such, the degree of neutralization may be up to 150%, preferably up to 120%, and more preferably up to 110%.

Suitable components c) include one or more at least difunctional polyisocyanates. For example, aliphatic isocyanates with a functionality of two, three and optionally higher, such as, hexamethylene diisocyanate, butane diisocyanate, isophorone diisocyanate, 1-methyl-2,4(2,6)-diisocyanato-cyclohexane, norbornane diisocyanate, tetramethylxylylene diisocyanate, hexahydroxylylene diisocyanate, nonane triisocyanate and 4,4'-diisocyanato-dicyclohexylmethane.

Likewise suitable, but less preferred, are aromatic isocyanates, such as 2,4 (2,6)-diisocyanatotoluene or 4,4'-diisocyanato-diphenylmethane, and also relatively high molecular weight or oligomeric polyisocyanates of the molecular weight range 336 to 1,500, based on the stated isocyanates. It is also possible to use mixtures of these isocyanates.

Preference is given to using 4,4'-diisocyanatodicyclohexylmethane and/or isophorone diisocyanate and/or hexamethylene diisocyanate and/or 1-methyl-2,4 (2,6)-diisocyanatocyclohexane, optionally also in a mixture with 2,4(2,6) diisocyanatotoluene.

Particular preference is given to the use of a difunctional aliphatic isocyanate component which includes at least 40 mol %, more preferably 75 mol %, very preferably 100 mol % of hexamethylene diisocyanate.

Suitable components d) are, for example, monohydroxy-functional ethylene oxide polyethers, monohydroxy-functional propylene oxide/ethylene oxide copolyethers and monohydroxy-functional propylene oxide/ethylene oxide block polyethers of the molecular weight range 200 to 3,000 g/mol, such as hydrazine, adipic dihydrazide, ethylenediamine, isophoronediamine, ethylene glycol, butanediol, hexanediol butyl glycol, butyl diglycol, methoxypropanol and other NCO-reactive compounds, and/or their mixtures.

It is possible to employ two different processes for preparing the hydroxy-functional polyester dispersions containing urethane groups.

One process provided by the invention is a one-stage process for preparing the polyester dispersions of the invention, characterized in that in a single reaction step components a) to d) are reacted at a temperature of 40 to 140° C. and in the presence of 5% to 50% by weight of organic solvents and also of non-NCO-reactive neutralizing agents until the NCO value has reached 0%, subsequently, optionally, neutralizing agents and, optionally, further organic solvents and/or auxiliaries are added, and water is added to the polymer solution or the polymer solution is added to water.

Subsequently it is possible, optionally, to add neutralizing agents and/or auxiliaries and, finally, to separate off excess quantities of solvent, completely or partially, by distillation.

The invention also provides a two-stage process for preparing the hydroxy-functional polyester dispersions containing urethane groups, characterized in that in a first step, an NCO-functional intermediate is prepared at 40 to 140° C. in the presence of 5% to 50% by weight of organic solvents and of non-NCO-reactive neutralizing agents, by reacting components b), c) and d) with an amount of component a) such as to result in an NCO:OH(NH) ratio of greater than 1.4:1. In a second step, the remainder of component a) and, optionally, further solvents and/or neutralizing agents are added and reaction is continued until the NCO content has reached 0%. Subsequently, optionally, neutralizing agents and, optionally, further organic solvents and/or auxiliaries are added, and water is added to the polymer solution or the polymer solution is added to water.

It is possible, again, to subsequently add neutralizing agents and/or auxiliaries and, to separate off excess quantities of solvent, completely or partially, by distillation.

As an option, it is possible to add to the reaction, both in the one-stage version and in the two-stage version, a suitable catalyst, for example, dibutyltin dilaurate, tin(II) octoate, dibutyltin oxide and diazabicyclononane.

As an option, it is possible to add to the reaction, both in the one-stage version and in the two-stage version, a suitable stabilizer, for example, dibutyl phosphate, phosphoric acid or chloropropionic acid.

The two-stage preparation process is preferred. In that preparation process, in the first reaction stage for preparing the NCO-functional intermediate, 4% to 30% by weight, preferably 4% to 20% by weight and very preferably 4% to 10% by weight of component a) is employed, based on the total amounts of the amounts of a) to d) employed in total in the first and second reaction stage. If component a) is used in amounts of 4% to 10% by weight in the first reaction stage, this component a) preferably has a functionality of >3.

With particular preference in the first reaction step
aI) 4% to 30% by weight of at least one hydroxy-functional polyester having an average functionality≧2,
b) 1% to 2.4% by weight of at least one di- and/or tri- and/or monohydroxycarboxylic acid and/or hydroxysulphonic acid and/or aminosulphonic acid and/or aminocarboxylic acid,
c) 4% 10.6% by weight of at least one at least difunctional polyisocyanate component and
d) 0 to 3% by weight of other components
are reacted to give an NCO-functional intermediate, which, in a second reaction step, is reacted with aII) 57.1% to 91% by weight of a hydroxy-functional polyester having an average functionality>3 to give a hydroxy-functional polyester containing urethane groups, the sum of the weight percentages of aI), b), c), d) and aII) always being 100%.

In the reaction products it is possible for the polyesters aI) and aII), respectively, to be, in principle, different or identical.

The hydroxy-functional polyester dispersions containing urethane groups of the invention contain in general 0 to 10% by weight, preferably 0 to 3% by weight, of organic solvents. The optional distillative removal of excess amounts of solvent may take place, for example, under reduced pressure at 20 to 80° C. during or after the operation of dispersing in/with distilled water.

The solids content of the polyester dispersions of the invention is 30% to 55% by weight, preferably 35% to 45% by weight.

The dispersions of the invention have particle diameters, determined for example by LCS measurements, of 25 to 500 nm, preferably of 50 to 180 nm.

Generally speaking it is possible to use the hydroxy-functional polyester dispersions containing urethane groups of the invention in paints, coatings, adhesives and sealants.

The invention likewise provides aqueous binder combinations comprising
A) hydroxy-functional polyester dispersions containing urethane groups of the invention and
B) at least one crosslinker resin.

Suitable crosslinker resins B) are blocked polyisocyanates B1), which optionally may be hydrophilically modified, and/or hydrophilic, unblocked polyisocyanates B2) and/or amino crosslinker resins, such as, for example, partly or fully etherified melamine resins and/or urea-formaldehyde condensation products and/or crosslinking amino resins.

The aqueous binder combinations comprising the dispersions of the invention are prepared either by mixing the ready polyester dispersion A) of the invention with one or more of the crosslinker resins B) described, or else one or more of the crosslinker resins is added during the actual preparation of the polyester dispersion, prior to the dispersing step, and then joint dispersion is carried out. This second version makes it possible to employ crosslinker resins which per se are not hydrophilic, but is confined to the use of crosslinker resins which under the preparation conditions-do not react with water.

The hydroxy-functional polyester dispersions containing urethane groups of the invention are used preferably in combination with optionally hydrophilicized, blocked polyisocyanates and/or amino crosslinker resins as 1-component coating compositions. These are, for example, baking paints and baking coatings which are cured at temperatures of 120 to 230° C. Particularly preferred uses in this context are baking surfacer coats, one-coat paints, stone-chip protection primers and pigmented topcoats.

The invention provides aqueous 1-component coating compositions comprising
A) 60% to 98% by weight, preferably 70% to 98% by weight, of polyester dispersions of the invention, optionally together with other dispersions, and
B1) 2% to 40% by weight, preferably 2% to 30% by weight, of at least one blocked polyisocyanate, which optionally may be hydrophilically modified, and/or of at least one amino crosslinker resin.

Suitable blocked polyisocyanates are, for example, reaction products of difunctional isocyanates such as isophorone diisocyanate, hexamethylene diisocyanate, 2,4- and/or 2,6-diisocyanatotoluene, 4,4'-diphenylmethane diisocyanate and/or the higher molecular weight trimers, biurets, urethanes, iminooxadiazinedione and/or allophanates thereof with blocking agent such as methanol, ethanol, butanol, hexanol, benzyl alcohol, acetoxime, butanone oxime, caprolactam, phenol, diethyl malonate, diethyl malonate, dimethylpyrazole, triazole, dimethyltriazole, ethyl acetoacetate, diisopropylamine, dibutylamine, tert-butylbenzylamine, cyclopentanone carboxyethyl ester, dicyclohexylamine and/or tert-butylisopropylamine.

The aforesaid blocked polyisocyanates may also be converted into a water-dispersible form by incorporation of hydrophilic groups, such as carboxylate, sulphonate and/or polyethylene oxide structures, for example, and so can be used in combination with the dispersions of the invention. The stated blocked polyisocyanates can also be prepared with accompanying use of hydroxy-functional and/or amino-functional components, including relatively high molecular weight components, such as diols, triols, amino alcohols, polyesters, polyethers, polycarbonates and mixtures of the stated and/or other raw materials.

The hydroxy-functional polyester dispersions containing urethane groups of the invention can also be used in combination with optionally hydrophilicized polyisocyanates having free isocyanate groups in aqueous 2-component coating compositions. In this utility the coating composition has a limited pot life of up to 24 hours. The coatings produced therefrom are curable at room temperature up to 80° C.

The present invention hence also provides aqueous 2-component coating compositions containing
A) 70% to 98% by weight of hydroxy-functional polyester dispersions containing urethane groups of the invention, optionally together with other dispersions, and
B2) 2% to 30% by weight of optionally hydrophilically modified polyisocyanates containing free isocyanate groups.

Where the dispersions of the invention are applied alone to substrates, clear coats are obtained which flow very well and exhibit no defects or craters, and very high coat thicknesses of up to more than 100 µm are possible. The dispersions do not exhibit any pronounced physical drying; in other words, the coats remain more or less tacky or grippy. Cured, tack-free and hard coats are obtained only by combination with at least one crosslinker resin and completed curing.

The aqueous binder combinations comprising the polyester dispersions of the invention may optionally include the typical auxiliaries and additives, such as organic and/or inorganic pigments or metallic pigments based on aluminium flakes, fillers such as carbon black, silica, talc, kaolin, glass in powder or fibre form, and mixtures of these and/or other materials commonplace for the preparation of paints, coatings and adhesives, for example.

In order to obtain particular effects it is also possible to add small amounts of auxiliaries customary in the paints and adhesives industries when preparing the polyester dispersions of the invention, such as, for example, surface-active substances, emulsifiers, stabilizers, anti-settling agents, UV stabilizers, catalysts for the crosslinking reaction, defoamers, antioxidants, anti-skinning agents, flow control agents, thickeners and/or bactericides.

The dispersions of the invention are suitable in principle for coating, painting, bonding, treating and sealing any of a very wide variety of substrates, particularly metals, wood, ceramic, stone, concrete, bitumen, hard fibre, glass, porcelain, plastics, leather and/or textiles of any of a very wide variety of kinds.

The paints of the invention can be applied to the substrate to be coated by methods that are known per se, such as spraying, flow coating, pouring, dipping, rolling or brushing.

The paints of the invention can also be used as part of a multi-coat paint system, composed for example of primer and/or surfacer and/or basecoat and/or topcoat. Also possible in this context are wet-on-wet painting processes, in which at least two coats are applied in succession, subjected optionally to preliminary drying, and then baked together. Proportionally the paints of the invention may also contain one or more other aqueous dispersions based, for example, on polyester, on polyurethane, on polyurethane-polyacrylate, on polyacrylate, on polyether, on polyester-polyacrylate, on alkyd resin, on addition polymer, on polyamide/imide and on polyepoxide.

In this way, preferably, paints are obtained which are distinguished by very good processing properties and to coatings having excellent film optical properties and flow, very low crater susceptibility, good resistance properties, a balanced level of hardness/elasticity and very good storage stability.

EXAMPLES

Desmodur® N 3300=hexamethylene diisocyanate trimer (Bayer MaterialScience AG, Germany)

Desmodur® T 80=toluylidene diisocyanate (Bayer MaterialScience AG, Germany)

Proglide® DMM=glycol ether solvent (DOW chemical company, USA)

Cymel® 328; Cymel® 327=aminocrosslinker resins (Cytec Ind. Inc., USA)

Additol® XW 395=film levelling additive (Cytec Ind. Inc., USA)

Surfynol® 104E=tenside (Air products and chemicals Inc.; USA)

Bayhydur® BL 5140=polyisocyanate dispersion with blocked isocyanate groups (Bayer MaterialScience AG, Germany)

Tronox® R-KB-4=titanium dioxide (Tronox Inc., USA)

Polyester Dispersion 1)

63 g of a polyester 1a) (reaction product of 1273 g of phthalic anhydride, 1080 g of adipic acid, 285.6 g of castor oil, 523 g of trimethylolpropane and 1523 g of neopentyl glycol; OH number=129 mg KOH/g polyester, acid number=2.0 mg KOH/g polyester, theoretical molecular weight 1500 g/mol, theoretical functionality 3.5), 21 g of dimethylolpropionic acid b) and 142 g of acetone are homogenized at 60° C. Following the addition of 84 g of hexamethylene diisocyanate-c) the mixture is stirred until the theoretical NCO content of about 7.3% is reached. This acetonic solution is then added to 882 g of polyester 1a), and the mixture is stirred at 60° C. until the NCO content is=0%. Then 142 g of acetone and 14 g of dimethylethanolamine are added and the mixture is homogenized. A dispersion is prepared by addition of 1560 g of distilled water, and then the acetone is distilled off.

This gives a hydroxy-functional polyester dispersion 1) containing urethane groups and having a solids content of 40%, a pH of 8.1, a viscosity of 35 seconds in the Ford DIN 4 cup at 23° C. and an average particle size of 150 nm. The urethane group content based on solids is 5.6%; the acid number incorporated via component b) is 8.4 mg KOH/g solids.

Polyester Dispersion 2)

108.9 g of polyester 1a) from polyester dispersion 1), 36.4 g of DMPA b) and 247 g of acetone are homogenized at 60° C. Then 21 g of ethyldiisopropylamine are added in order to convert some of the carboxyl groups of the dimethylolpropionic acid into carboxylate groups. Subsequently 145.3 g of hexamethylene diisocyanate c) are added and the mixture is stirred until the NCO value is<5.8%. This acetonic solution is then added to 1525 g of polyester 1a), and the mixture is stirred at 60° C. until the NCO value is=0%. Then 247 g of acetone and 9.7 g of dimethylethanolamine are added and the mixture is homogenized. A dispersion is prepared by addition of 2694 g of distilled water, and then the acetone is distilled off.

This gives a hydroxy-functional polyester dispersion 2) containing urethane groups and having a solids content of 40%, a pH of 8.3, a degree of neutralization of 100%, a viscosity of 24 seconds in the Ford DIN 4 cup at 23° C. and an average particle size of 120 nm. The molecular weight determined by gel permeation chromatography is approximately 16 000 g/mol. The urethane group content based on solids is 5.6%; the acid number incorporated via component b) is 8.4 mg KOH/g solids.

Polyester Dispersion 3)

39.1 g of a polyester 2a) (reaction product of 977 g of phthalic anhydride, 1606 g of adipic acid, 590 g of trimethylolpropane and 1830 g of neopentyl glycol; OH number=157 mg KOH/g polyester, acid number=1.8 mg KOH/g polyester, theoretical molecular weight 1100 g/mol, theoretical functionality 3.1), 13.1 g of dimethylolpropionic acid b), 93 g of acetone and 7.5 g of ethyldiisopropylamine are homogenized at 60° C. Following the addition of 56.5 g of hexamethylene diisocyanate c) the mixture is stirred until the theoretical NCO content of about 7.4% is reached. This acetonic solution is then added to 544 g of polyester 2a), and the mixture is stirred at 60° C. until the NCO content is=0%. Then 93 g of acetone and 3.5 g of dimethylethanolamine are added and the mixture is homogenized. A dispersion is prepared by addition of 967 g of distilled water, and then the acetone is distilled off. This gives a hydroxy-functional polyester dispersion 3) containing urethane groups and having a solids content of 41%, a pH of 8.0, a viscosity of 15 seconds in the Ford DIN 4 cup at 23° C. and an average particle size of 160 nm. The urethane group content based on solids is 6.1%; the acid number incorporated via component b) is 8.4 mg KOH/g solids.

Polyester Dispersion 4)

39.1 g of a polyester 3a) (reaction product of 986 g of phthalic anhydride, 1621 g of adipic acid, 595 g of trimethylolpropane, 311 g of castor oil and 1732 g of neopentyl glycol; OH number=129 mg KOH/g polyester, acid number=1.2 mg KOH/g polyester, theoretical molecular weight 1500 g/mol, theoretical functionality 3.4), 13.1 g of dimethylolpropionic acid b), 93 g of acetone and 5.9 g of triethylamine are homogenized at 60° C. Following the addition of 57.3 g of hexamethylene diisocyanate c) the mixture is stirred until the theoretical NCO content of about 6.5% is reached. This acetonic solution is then added to 542 g of polyester 3a), and the mixture is stirred at 60° C. until the NCO content is=0%. Then 93 g of acetone and 3.5 g of dimethylethanolamine are added and the mixture is homogenized. A dispersion is prepared by addition of 967 g of distilled water, and then acetone is distilled off. This gives a hydroxy-functional polyester dispersion 4) containing urethane groups and having a solids content of 40%, a pH of 8.3, a viscosity of 50 seconds in the Ford DIN 4 cup at 23° C. and an average particle size of 120 nm. The urethane group content based on solids is 6.2%; the acid number incorporated via component b) is 8.4 mg KOH/g solids.

Polyester Dispersion 5)

74.2 g of a polyester 4a) (reaction product of 1273 g of phthalic anhydride, 1080 g of adipic acid, 523 g of trimethylolpropane, 285 g of castor oil and 1619 g of neopentyl glycol; OH number=142 mg KOH/g polyester, acid number=1.6 mg KOH/g polyester, theoretical molecular weight 1280 g/mol, theoretical functionality 3.2), 18.6 g of dimethylolpropionic acid b) and 203.7 g of acetone are homogenized at 60° C. Following the addition of 62.2 g of hexamethylene diisocyanate and 15.8 g of isophorone diisocyanate c) the mixture is stirred until the theoretical NCO content of about 4.7% is reached. This acetonic solution is then added to 757 g of polyester 4a), and the mixture is stirred at 60° C. until the NCO content is=0%. Then 67 g of acetone, 12.3 g of dimethylethanolamine and 35.3 g of butyl glycol are added and the mixture is homogenized. A dispersion is prepared by addition of 1353.7 g of distilled water, and then acetone is distilled off. This gives a hydroxy-functional polyester dispersion 5) containing urethane groups and having a solids content of 40.4%, a pH of 8.1, a viscosity of 1100 mPAs/23° C. and an average particle size of 100 nm. The urethane group content based on solids is 5.6%; the acid number incorporated via component b) is 8.4 mg KOH/g solids.

Polyester Dispersion 6)

62.4 g of a polyester 5a) (reaction product of 1552 g of phthalic anhydride, 920 g of adipic acid, 549 g of trimethylolpropane, 300 g of castor oil and 1610 g of neopentyl glycol; OH number=129 mg KOH/g polyester, acid number=1.2 mg KOH/g polyester, theoretical molecular weight 1500 g/mol, theoretical functionality 3.5), 20.9 g of dimethylolpropionic acid b) and 193.5 g of acetone are homogenized at 60° C. Following the addition of 83.2 g of hexamethylene diisocyanate c) the mixture is stirred until the theoretical NCO content of about 6.7% is reached. This acetonic solution is then added to 874 g of polyester 5a), and the mixture is stirred at 60° C. until the NCO content is=0%. Then 60 g of acetone, 13.9 g of dimethylethanolamine and 39.6 g of butyl glycol are added and the mixture is homogenized. A dispersion is prepared by addition of 1507 g of distilled water, and then acetone is distilled off. This gives a hydroxy-functional polyester dispersion 6) containing urethane groups and having a solids content of 41%, a pH of 8.1, a viscosity of 1100 mPas/23° C. and an average particle size of 164 nm. The urethane group content based on solids is 5.6%; the acid number incorporated via component b) is 8.4 mg KOH/g solids.

Polyester Dispersion 7)

58.5 g of polyester 4a) from polyester dispersion 5), 19.5 g of a monohydroxy-functional methoxy polyethylene glycol d) having a molecular weight of 500, 19.5 g of DMPA b) and 204 g of acetone are homogenized at 60° C. Subsequently 78 g of hexamethylene diisocyanate are added and the mixture is stirred until the theoretical NCO value of approximately 4.8% is reached. This acetonic solution is then added to 800 g of polyester 4a), and the mixture is stirred at 60° C. until the NCO value is=0%. Then 68 g of acetone, 12.9 g of dimethylethanolamine and 36.4 g of butyl glycol are added and the mixture is homogenized. A dispersion is prepared by addition of 1413 g of distilled water, and then the acetone is distilled off. This gives a hydroxy-functional polyester dispersion 7) containing urethane groups and having a solids content of 40.3%, a pH of 8.2, a viscosity of 400 mPAs/23° C. and an average particle size of 95 nm. The urethane group content based on solids is 5.6%; the acid number incorporated via component b) is 8.4 mg KOH/g solids.

Polyester Dispersion 8)

583 g of a polyester 6a) (reaction product of 955 g of phthalic anhydride, 356 g of isophthalic acid 1318 g of adipic acid, 576 g of trimethylolpropane and 1722 g of neopentyl glycol; OH number=136 mg KOH/g polyester, acid number=2.3 mg KOH/g polyester, theoretical molecular weight 1400 g/mol, theoretical functionality 3.3), 13.1 g of dimethylolpropionic acid b), 186 g of acetone and 7.5 g of ethyldiisopropylamine are homogenized at 60° C. Following the addition of 56.5 g of hexamethylene diisocyanate c) the mixture is stirred until the NCO content is=0%. 3.5 g of dimethylethanolamine are added and the mixture is homogenized. By addition of 967 g of distilled water that has a temperature of 25° C., a dispersion is prepared, the acetone being distilled off, in parallel to the addition of water, by application of a vacuum, at a rate such that the amount of acetone removed by distillation corresponds approximately to the amount of dispersing water added. The distillation is commenced when about 15% of the amount of water has been added. This gives a hydroxy-functional polyester dispersion 8) containing urethane groups and having a solids content of 41%, a pH of 8.2, a viscosity of 17 seconds in the Ford DIN 4 cup at 23° C. and an average particle size of 170 nm. The urethane group content based on solids is 6.1%; the acid number incorporated via component b) is 8.4 mg KOH/g solids.

Polyester Dispersion 9)

58.8 g of a polyester 4a) (reaction product of 1273 g of phthalic anhydride, 1080 g of adipic acid, 523 g of trimethylolpropane, 285 g of castor oil and 1619 g of neopentyl glycol; OH number=142 mg KOH/g polyester, acid number=1.6 mg KOH/g polyester, theoretical molecular weight 1280 g/mol, theoretical functionality 3.2), 19.6 g of dimethylolpropionic acid b), 9.4 g of ethyldiisopropylamine and 135.8 of acetone are homogenized at 60° C. Following the addition of 78.4 g of hexamethylene diisocyanate c) the mixture is stirred until the theoretical NCO content of approximately 5.8% has been reached. This acetonic solution is then admixed with 823 g of polyester 4a) and stirred at 60° C. until the NCO content is=0%. 67 g of acetone, 6.5 g of dimethylethanolamine and 37.3 g of butyl glycol are added and the mixture is homogenized. By addition of 1416 g of distilled water that has a temperature of 20° C., a dispersion is prepared, the acetone being distilled off, in parallel to the addition of water, by application of a vacuum, at a rate such that the amount of acetone removed by distillation corresponds approximately to the amount of dispersing water added. This gives a hydroxy-functional polyester dispersion 9) containing urethane groups and having a solids content of 44.1%, a pH of 8.3, a viscosity of 650 mPas at 23° C. and an average particle size of 129 nm. The urethane group content based on solids is 5.6%; the acid number incorporated via component b) is 8.4 mg KOH/g solids.

Polyester Dispersion 10)

103.6 g of a polyester (reaction product of 557 g of phthalic anhydride and 500 g of hexanediol; OH number=56 mg KOH/g polyester, acid number=1.0 mg KOH/g polyester, theoretical molecular weight 2000 g/mol, theoretical functionality 2.0), 21.1 g of dimethylolpropionic acid b) and 203.7 g of acetone are homogenized at 60° C. Following the addition of an isocyanate mixture c) of 68.7 g of hexamethylene diisocyanate and 17.9 g of isophorone diisocyanate the mixture is stirred until the theoretical NCO content of about 5.7% is reached. This acetonic solution is then admixed with 845.5 g of polyester 1a) and the mixture is stirred at 60° C. until the NCO content is=0%. Then 67 g of acetone, 14.0 g of dimethylethanolamine and 39.6 g of butyl glycol are added and the mixture is homogenized. A dispersion is prepared by addition of 1533 g of distilled water, and then acetone is distilled off. This gives a hydroxy-functional polyester dispersion 10) containing urethane groups and having a solids content of 41.6%, a pH of 8.3, a viscosity of 700 mPas at 23° C. and an average particle size of 175 nm.

The urethane group content based on solids is 5.4%; the acid number incorporated via component b) is 8.4 mg KOH/g solids.

Polyester Dispersion 11)

57.2 g of a polyester (reaction product of 700 g of adipic acid and 478 g of butanediol; OH number=50 mg KOH/g polyester, acid number=1.2 mg KOH/g polyester, theoretical molecular weight 2250 g/mol, theoretical functionality 2.0), 19.1 g of dimethylolpropionic acid b), and 257.3 g of acetone are homogenized at 60° C. Following the addition of an isocyanate mixture c) of 62 g of hexamethylene diisocyanate and 14.3 g of Desmodur® N3300, Bayer AG, hexamethylene diisocyanate trimer, the mixture is stirred until the theoretical NCO content of about 4.9% is reached. This acetonic solution is then admixed with 801 g of polyester 1a) and the mixture is stirred at 60° C. until the NCO content is=0%. Then 12.7 g of dimethylethanolamine and 36.3 g of butyl glycol are added and the mixture is homogenized. A dispersion is prepared by addition of 1381 g of distilled water and then acetone is distilled off. This gives a hydroxy-functional polyester dispersion 11) containing urethane groups and having a solids content of 36%, a pH of 8.8, a viscosity of 60 seconds in the Ford DIN 4 cup at 23° C. and an average particle size of 240 nm. The urethane group content based on solids is 5.0%; the acid number incorporated via component b) is 8.4 mg KOH/g solids.

Polyester Dispersion 12)

55.4 g of a polyether (difunctional polypropylene oxide polyether, molecular weight 2000 g/mol, theoretical functionality 2.0), 19.7 g of dimethylolpropionic acid b), and 257.3 g of acetone are homogenized at 60° C. Following the addition of an isocyanate mixture c) of 59.2 g of hexamethylene diisocyanate and 16.9 g of toluylidene diisocyanate Desmodur® T80, Bayer AG, the mixture is stirred until the theoretical NCO content of about 5.6% is reached. This acetonic solution is then admixed with 788 g of polyester 1a) and the mixture is stirred at 60° C. until the NCO content is=0%. Then 13.1 g of dimethylethanolamine and 35.8 g of butyl glycol are added and the mixture is homogenized. A dispersion is prepared by addition of 1360 g of distilled water and then acetone is distilled off. This gives a hydroxy-functional polyester dispersion 12) containing urethane groups and having a solids content of 39.8%, a pH of 8.3, a viscosity of 27 seconds in the Ford DIN 4 cup at 23° C. and an average particle size of 190 nm. The urethane group content based on solids is 5.0%; the acid number incorporated via component b) is 8.8 mg KOH/g solids.

Polyester Dispersion 13)

33.3 g of polyester 2a), 9.0 g of dimethylolpropionic acid b) and 46.2 g of Proglyde® DMM are homogenized at 60° C. Following the addition of an isocyanate mixture c) of 25.0 g of hexamethylene diisocyanate and 11.4 g of isophorone diisocyanate, the mixture is stirred at 70-85° C. until the theoretical NCO content of about 5.5% is reached. This solution is then admixed with 338.3 g of polyester 2a) and the mixture is stirred until the NCO content is=0%. Then 6.1 g of dimethylethanolamine and 21.9 g of butyl glycol are added and the mixture is homogenized. A dispersion is prepared by addition of 550 g of distilled water, and then acetone is distilled off. This gives a hydroxy-functional polyester dispersion 13) containing urethane groups and having a solids content of 40.4%, a pH of 7.8, a viscosity of 200 mPAs at 23° C. and an average particle size of 200 nm. The urethane group content based on solids is 5.7%; the acid number incorporated via component b) is 8.9 mg KOH/g solids.

Polyester Dispersion 14)

223.9 g of a polyester (reaction product of 557 g of phthalic anhydride and 500 g of hexanediol; OH number=56 mg KOH/g polyester, acid number=1.0 mg KOH/g polyester, theoretical molecular weight 2000 g/mol, theoretical functionality 2.0), 22.4 g of dimethylolpropionic acid b) and 203.7 g of acetone are homogenized at 60° C. Following the addition of 89.6 g of hexamethylene diisocyanate c) the mixture is stirred until the theoretical NCO content of about 4.0% is reached. This acetonic solution is then admixed with 784 g of polyester 1a) and the mixture is stirred at 60° C. until the NCO content is=0%. Then 67 g of acetone, 14.9 g of dimethylethanolamine and 42.6 g of butyl glycol are added and the mixture is homogenized. A dispersion is prepared by addition of 1622 g of distilled water, and then acetone is distilled off. This gives a hydroxy-functional polyester dispersion 14) containing urethane groups and having a solids content of 38%, a pH of 8.4, a viscosity of 900 mPas at 23° C. and an average particle size of 80 nm. The urethane group content based on solids is 5.4%; the acid number incorporated via component b) is 8.4 mg KOH/g solids.

Paint Testing:

Clearcoat A): 179 g of inventive polyester dispersion 3), 29.4 g of amino crosslinker resin Cymel® 328 from Cytec, 1.8 g of Additol® XW 395 from UCB, 1.8 g of Surfynol® 104 E from Air Products and 0.2 g of dimethylethanolamine are formulated to a clearcoat. The clearcoat has a solids content of 46.2%, a pH of 8.3 and a flow time in the DIN 4 cup/23° C. of 16 s.

After storage at 40° C. for 10 days the viscosity remains virtually unchanged (15 s).

Clearcoat B): 182.9 g of an aqueous polyester in accordance with Example 2) from EP 498 156, having a urethane group content of 7.7%, a degree of neutralization of 100%, a pH of 8.3, an acid number of 18 mg KOH/G solids and a solids content of approximately 40%, 29.4 g of amino crosslinker resin Cymel® 328, 1.8 g of Additol® XW 395, 1.8 g of Surfynol® 104 E, 0.2 g of dimethylethanolamine and 17 g of distilled water are formulated to a clearcoat. The clearcoat has a solids content of 42.9%, a pH of 8.3 and a flow time of 40 s.

After storage at 40° C. for 10 days the viscosity rises from 40 to 50 s.

Both dispersions were subjected to a pour-on test and sagging test on glass plates, the parameters tested including, in particular, the levelling properties and the propensity towards cratering on filming. The evaluation levels in these tests are from 1=very good to 5=deficient, with the corresponding gradations in between. Following their preparation, the clearcoats were applied to metal panels, flashed off at room temperature for 10 minutes and then baked at 130° C. for 30 minutes.

| Test results | Clearcoat A (inventive) | Clearcoat B (comparative) |
|---|---|---|
| Pour-on test of the dispersion | | |
| Craters | quantity 1/size 1 | quantity 3/size 2 |
| Levelling | excellent (1) | acceptable (2-3) |
| Testing of the coating film after baking: | | |
| Pendulum hardness (s) | 75 | 78 |
| Dissolubility* | 1122 | 1122 |
| Elasticity (Erichsen cupping) mm | 9 | 8.5 |
| Impact test (in/out) | >80/>80 | >80/>80 |
| Film surface | smooth, undisrupted | individual craters |

*Dissolubility test: exposure for 1 minute in each case with 4 different solvents:
Evaluation:
0 = nothing found,
1 = slight softening (reversible),
2 = moderate softening (reversible),
3 = severe softening,
4 = damage to coating,
5 = coating detached On comparison, clearcoat A), based on the inventive polyester dispersion 3) containing urethane groups, exhibits film mechanical properties comparable with those of clearcoat B), based on the comparative dispersion, although not only the urethane group content but also the acid number are significantly lower and, as is known, urethane groups in particular make an especially large contribution to the level of mechanical properties of a coating. Furthermore, the inventive polyester dispersion containing urethane groups exhibits distinct advantages in the pour-on test—there are virtually no craters and the levelling is excellent—whereas the comparative exhibits a distinct number of craters and a state of levelling which, although still acceptable, is nevertheless significantly poorer. The surface of the cured coating film is excellent in the case of the inventive clearcoat, while for the comparative there are individual craters apparent.

The clearcoat prepared from the inventive dispersion also exhibits, surprisingly, better storage stability than the comparative dispersion.

Clearcoat C): 184.7 g of the inventive polyester dispersion 2), 29.4 g of amino crosslinker resin Cymel® 328, 1.8 g of Additol® XW 395, 1.8 g of Surfynol® 104E, 0.1 g of dimethylethanolamine and 8.0 g of distilled water are formulated to a clearcoat. The clearcoat has a solids content of 44.3%, a pH of 8.3 and a viscosity of 40 s.

Clearcoat D): 135.4 g of an aqueous polyester of Example 1) of EP 498 156, 29.4 g of amino crosslinker resin Cymel® 328, 1.8 g of Additol® XW 395, 1.8 g of Surfynol® 104E, 2.0 g of dimethylethanolamine and 68.0 g of distilled water are formulated to a clearcoat. The clearcoat has a solids content of 42.0%, a pH of 8.3 and a viscosity of 40 s.

Both dispersions were subjected to a pour-on test and sagging test on glass plates, the parameters tested including, in particular, the levelling properties and the propensity towards cratering on filming. Following their preparation, the clearcoats are applied to metal panels, flashed off at room temperature for 10 minutes and then baked at 130° C. for 30 minutes.

| Test results | Clearcoat C (inventive) | Clearcoat D (comparative) |
|---|---|---|
| Pour-on test of the dispersion | | |
| Craters | quantity 1/size 1 | quantity 3/size 2 |
| Levelling | excellent (1) | acceptable (2-3) |
| Testing of the coating film after baking: | | |
| Pendulum hardness (s) | 82 | 65 |
| Dissolubility* | 1022 | 1022 |
| Elasticity (Erichsen cupping) mm | 8.5 | 8.5 |
| Impact test (in/out) | >80/>80 | >80/>80 |
| Film surface | smooth, undisrupted | individual craters |

*Dissolubility test: exposure for 1 minute in each case with 4 different solvents:
Evaluation:
0 = nothing found,
1 = slight softening (reversible),
2 = moderate softening (reversible),
3 = severe softening,
4 = damage to coating,
5 = coating detached On comparison, clearcoat C), based on the inventive polyester dispersion 2) containing urethane groups, exhibits film mechanical properties better than those of clearcoat D), based on the comparative dispersion, although not only the urethane group content but also the acid number are significantly lower and, as is known, urethane groups in particular make an especially large contribution to the level of mechanical properties of a coating. Furthermore, the inventive polyester dispersion containing urethane groups exhibits distinct advantages in the pour-on test—there are virtually no craters and the levelling is excellent—whereas the comparative exhibits a distinct number of craters and a state of levelling which, although still acceptable, is nevertheless significantly poorer. The surface of the cured coating film is excellent in the case of the inventive clearcoat, while for the comparative there are individual craters apparent.

Clearcoat E): 100 g of the inventive polyester dispersion 2), 56.1 g of polyisocyanate dispersion Bayhydur® BL 5140 from Bayer, which contains blocked isocyanate groups, 1.1 g of Additol® XW 395, 1.1 g of Surfynol® 104E and 10.0 g of distilled water are formulated to a clearcoat. The clearcoat has a solids content of 37.3%, a pH of 8.5 and a viscosity of 40 s.

After storage at 40° C. for 10 days the clearcoat is still homogeneous and can be used without any loss of quality.

Clearcoat F): 74 g of an aqueous polyester of Example 1) of EP-A 498 156, 56.1 g of polyisocyanate dispersion Bayhydur® BL 5140, which contains blocked isocyanate groups, 1.1 g of Additol® XW 395, 1.1 g of Surfynol® 104E, 0.9 g of dimethylethanolamine and 28.0 g of distilled water are formulated to a clearcoat. The clearcoat has a solids content of 39.6%, a pH of 8.4 and a viscosity of 31 s.

After storage at 40° C. for 10 days the clearcoat shows instances of precipitation, and can then no longer be used without a considerable loss of quality.

| Test results | Clearcoat E (inventive) | Clearcoat F (comparative) |
|---|---|---|
| After baking (30 min, 140° C.): | | |
| Pendulum hardness (s) | 69 | 56 |
| Dissolubility* | 3344 | 3344 |

-continued

| Test results | Clearcoat E (inventive) | Clearcoat F (comparative) |
|---|---|---|
| Elasticity (Erichsen cupping) mm | >9 | >9 |
| Impact test (in/out) | >80/>80 | >80/>80 |
| Film surface | smooth, undisrupted | smooth, a few defects |

*Dissolubility test: exposure for 1 minute in each case with 4 different solvents:
Evaluation:
0 = nothing found,
1 = slight softening (reversible),
2 = moderate softening (reversible),
3 = severe softening,
4 = damage to coating,
5 = coating detached The clearcoat formulated on the basis of inventive dispersion 2) in combination with a blocked polyisocyanate crosslinker shows a better level of properties overall (pendulum hardness, film surface) than the comparative.

Clearcoat G: 187.5 g of the inventive polyester dispersion 4), 29.4 g of amino crosslinker resin Cymel® 328, 1.8 of Additol® XW 395, 1.8 g of Surfynol® 104E and 0.1 g of dimethylethanolamine are formulated to a clearcoat. The clearcoat has a solids content of 45.3%, a pH of 8.2 and a viscosity of 32 s.

After 10 days of storage at 40° C. the viscosity has dropped slightly to 28 s, but the coating material is still homogeneous and fully functional. The sagging test on the dispersion leads to excellent values; the baked coating film has excellent film optical qualities, attractive mechanical properties, and very good solvent resistance.

Clearcoat H): 1100.0 g of the inventive polyester dispersion 8), 56.1 g of polyisocyanate dispersion Bayhydur® BL 5140, which contains blocked isocyanate groups, 1.1 g of Additol® XW 395, 1.1 g of Surfynol® 104E and 1.0 g of distilled water are formulated to a clearcoat.

The clearcoat has a solids content of 39.6%, a pH of 8.6 and a viscosity of 40 s and leads to coatings having properties comparable with those of clearcoat E).

After storage at 40° C. for 10 days the clearcoat is still homogeneous and can be used.

Pigmented Topcoat I)

14.63 g of inventive polyester dispersion 2), 1.2 g of 10% strength aqueous dimethylethanolamine solution, 4.5 g of water and 30 g of Tronox® R-KB-4 titanium dioxide are used to prepare a millbase, which is blended with 36.6 g of inventive polyester dispersion 2), 10 g of amino crosslinker resin Cymel® 327, 0.4 g of Byk® 301 and 2.68 g. This gives a white-pigmented topcoat having a viscosity in the DIN 4 mm cup at 23° C. of 31 s, a PH of 8.8 and a solids content of 58%.

Pigmented Topcoat J and K)

The preparation of pigmented topcoat I) is repeated, replacing the inventive polyester dispersion 2) by, for topcoat J), a dispersion as per Example 1) of EP-A 498 156 and, for topcoat K), a dispersion as per Example 2) of EP-A 498 156. Topcoat J) has a viscosity of 33 s, a solids content of 60% and a pH of 8.4. Topcoat K) has a viscosity of 32 s, a pH of 8.5 and a solids content of 59%.

| Test results | Pigmented paint I) (inventive) | Pigmented paint J) (comparative) | Pigmented paint K) (comparative) |
|---|---|---|---|
| Baking on Bonder panel or glass (10 min, 160° C.): | | | |
| Film thickness [ym] | 32-35 | 30-31 | 30-31 |
| Pendulum hardness (s) | 93 | 64 | 66 |
| Adhesion (1 = very good; 5 = poor) | 1 | 1 | 1-2 |
| Dissolubility (MEK wipe test (100 double rubs) | n.f.* | n.f. | n.f. |
| Elasticity (Erichsen cupping) mm | 7.3 | 6.3 | 7.3 |
| Gloss (60°) | 89 | 87 | 88 |
| Film surface | smooth, defect-free | smooth, few defects | smooth, few defects |
| Whiteness, immediate | 89 | 89 | 90 |
| Whiteness after 96 h at 180° C. | 22 | 7 | 7 |

*n.f. = nothing found

The coating of the invention shows the best level of properties overall for the baked coating, despite being based on more reasonably priced raw materials. It has better film mechanical properties/hardness, a better film surface, and the best retention of whiteness after prolonged high-temperature exposure.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Hydroxy-functional polyester dispersions containing urethane groups and comprising the following synthesis components:
   a) 87.0% to 95% by weight of at least one hydroxyl-functional polyester having an average functionality>2,
   b) 1% to 2.4% by weight of at least one di- and/or tri- and/or mono hydroxycarboxylic acid and/or aminocarboxylic acid,
   c) 4% to 10.6% by weight of one or more at least difunctional polyisocyanates and
   d) 0 to 3% by weight of other components,
   the percentages a) to d) adding up to 100%, and at least 50% of the acid groups incorporated via component b) are in the form of salt groups, wherein the acid number of the polyester dispersions incorporated via component b) is 5.0 to 9.9mg KOH/g substance, and wherein the urethane group content of the of the polyester dispersions is from 3.0% by weight to 6.4% by weight.

2. Hydroxy-functional polyester dispersions containing urethane groups according to claim 1, wherein the average molecular weight $M_w$ of the polyester dispersions is 8000 to 26,000 g/mol.

3. Hydroxy-functional polyester dispersions containing urethane groups according to claim 1, wherein the polyesters of component a) have an average functionality of>2.5.

4. Hydroxyl-functional polyester dispersions containing urethane groups according to claim 1, characterized in that the polyesters of component a) are reaction products of a1) 30% to 77% by weight of one or more at least difunctional carboxylic acids and/or anhydrides thereof, a2) 20% to 50% by weight of at least one diol, a3) 3% to 30% by weight of at least one alcohol having more than 2 hydroxyl groups, a4) 0 to 20% by weight of other hydroxyl- and/or carboxy-functional components and/or caprolactone.

5. A method of preparing the hydroxy-functional polyester dispersions containing urethane groups according to claim 1, comprising reacting components a) to d) at a temperature of 40 to 140° C. and in the presence of 5% to 50% by weight of organic solvents and non-NCO-reactive neutralizing agents until the NCO value has reached 0%.

6. A method of preparing the hydroxy-functional polyester dispersions containing urethane groups according to claim 5, further comprising adding neutralizing agents and additional organic solvents and/or auxiliaries, and blending water with the polymer solution.

7. A process of preparing paints, coatings, adhesives or sealants comprising preparing the hydroxy-functional polyester dispersions containing urethane groups according to claim 1.

8. Aqueous binder combinations comprising

A) hydroxy-functional polyester dispersions containing urethane groups according to claim 1 and B) at least one crosslinker resin.

9. Aqueous 1-component coating compositions comprising

A) 60% to 98% by weight of polyester dispersions according to claim 1, optionally together with other dispersions, and B1) 2% to 40% by weight of at least one blocked polyisocyanate, which optionally may be hydrophilically modified, and/or of at least one amino crosslinker resin.

10. Baking surfacer coats, one-coat paints, stone-chip protection primers or pigmented topcoats obtained from the aqueous 1-component coating compositions according to claim 9.

11. Aqueous 2-component coating compositions comprising

A) 70% to 98% by weight of hydroxy-functional polyester dispersions containing urethane groups according to claim 1, optionally together with other dispersions, and B2) 2% to 30% by weight of optionally hydrophilically modified polyisocyanates containing free isocyanate groups.

12. A method of preparing hydroxy-functional polyester dispersions containing urethane groups and comprising the following synthesis components:

a) 87.0% to 95% by weight of at least one hydroxyl-functional polyester having an average functionality>2, b) 1% to 2.4% by weight of at least one di- and/or tri- and/or mono hydroxycarboxylic acid and/or aminocarboxylic acid, c) 4% to 10.6% by weight of one or more at least difunctional polyisocyanates and d) 0 to 3% by weight of other components, the percentages a) to d) adding up to 100%, and at least 50% of the acid groups incorporated via component bi are in the form of salt groups, and wherein the acid number of the polyester dispersions incorporated via component b) is 5.0 to 9.9 mg KOH/g substance, comprising i) preparing an NCO-functional intermediate by reacting components b), c) and d) with an amount of component a) such as to result in an NCO:OH(NH) ratio of greater than 1.4:1, at 40 to 140° C. in the presence of 5% to 50% by weight of organic solvents and non-NCO-reactive neutralizing agents, and ii) adding the remainder of component a) to the NCO-functional intermediate and, optionally, further solvents and/or neutralizing agents until the NCO content has reached 0%.

13. A method of preparing hydroxy-functional polyester dispersions containing urethane groups according to claim 12, further comprising adding neutralizing agents and, additional organic solvents and/or auxiliaries, and blending water with the polymer solution.

14. The method of preparing hydroxy-functional polyester dispersions containing urethane groups according to claim 12, characterized in that in step i), 4% to 30% by weight of component a) are used, based on the total amounts of the amounts of a) to d) used in total.

* * * * *